Nov. 16, 1943. H. V. ALEXANDERSSON ET AL 2,334,469
INDUCTION COMPASS
Filed Jan. 12, 1942 2 Sheets-Sheet 1

INVENTOR
HARALD VALDEMAR ALEXANDERSSON
and ADOLPH STELLAN DAHLSTEDT
BY
their ATTORNEY Nov. 16, 1943.     H. V. ALEXANDERSSON ET AL     2,334,469
INDUCTION COMPASS
Filed Jan. 12, 1942     2 Sheets—Sheet 2

INVENTOR
HARALD VALDEMAR ALEXANDERSSON
and ADOLPH STELLAN DAHLSTEDT
BY
their ATTORNEY Patented Nov. 16, 1943

2,334,469

UNITED STATES PATENT OFFICE 2,334,469

INDUCTION COMPASS

Harald Valdemar Alexandersson and Adolf Stellan Dahlstedt, Lidingo, Sweden, assignors to Aga-Baltic Aktiebolag, Stockholm, Sweden, a corporation of Sweden Application January 12, 1942, Serial No. 426,461
In Sweden January 13, 1941

5 Claims. (33—204)

This invention relates to an induction compass.

In previous induction compasses an electrically conducting loop was rotated in the earth's magnetical field and the voltage produced in the loop was measured. This voltage varies with the component of the earth magnetical field which is perpendicular to the axis of rotation of the loop. The magnetic north-south-line is determined as the direction in which the greatest voltage is produced in the rotating loop. These induction compasses have, however, never attained practical importance due to two separate disadvantages. First the voltage produced in the rotating loop was extremely weak and therefor the most sensitive and expensive instruments were required for measuring the voltage. Even then sufficient precision was not obtained. Secondly, changes of direction in the vicinity of the north-south direction produce only very small changes in induced voltage.

It has also been proposed to produce a voltage sufficiently strong for reliable measurements by using a ferro-magnetic path, preferably with high permeability, for concentrating the magnetic lines through the loop. A higher degree of precision was obtained by polarizing the magnetic field in such a way, that a cardioidic field pattern was obtained similar to the pattern produced in radio direction finders. Such arrangements, however, did not produce sufficient precision and moreover they have the disadvantage that too great declination is obtained, since the polarizing field intensity is distorted in relation to the field intensity of the earth magnetism.

According to the present invention two cooperating induction compasses are used which are polarized in different directions, whereby two cardioidic voltage diagrams, differing in phase by 180° are obtained. Thus the above mentioned disadvantages are obviated.

Figure 1:
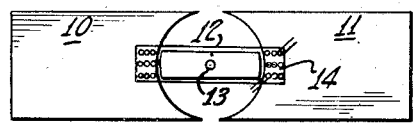
Figure 2:
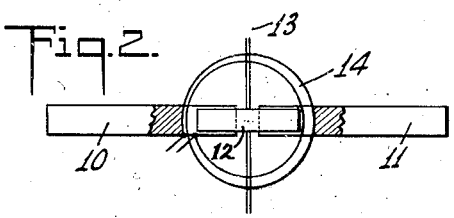
Figure 4:
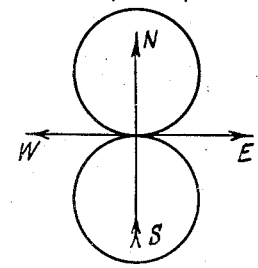
Figure 3:
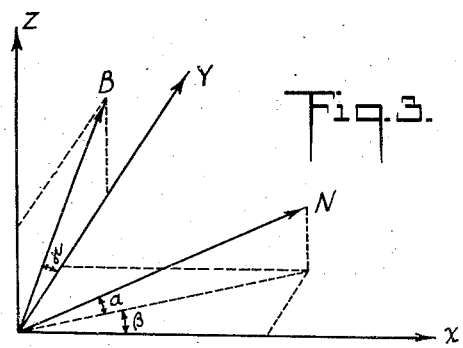
Figure 8:
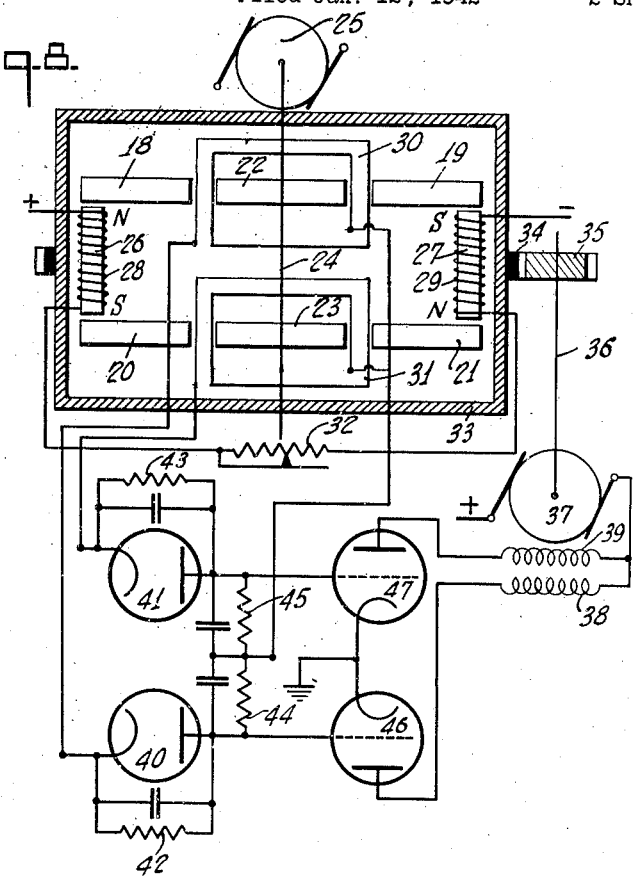
Figure 9:
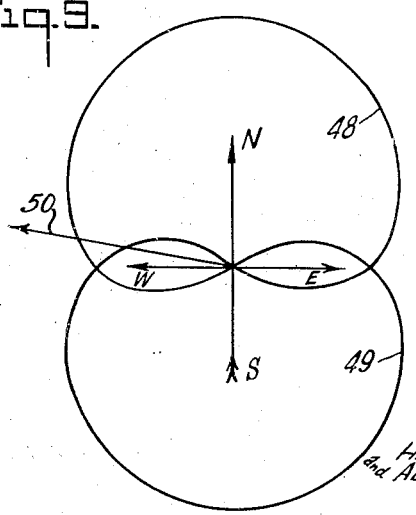

The invention will be described in connection with the annexed drawings, in which Figs. 1 and 2 show the prior art arrangement; Fig. 3 is a vector-diagram, and Figs. 4, 5, 6 and 7 are charts for explaining the operation of the arrangement shown in Figs. 1 and 2; Fig. 8 is a diagrammatic illustration showing one embodiment of the invention, and Fig. 9 is a characteristic curve for explaining the operation of this embodiment.

In Figs. 1 and 2, 10 and 11 indicate two cores of iron with high permeability. The cores are opposed, and the ends are formed as pole pieces, in the field of which an armature 12 of iron with high permeability rotates, driven by the shaft 13.

In the central part of each pole piece a notch is formed in which a winding 14 is placed.

The armature 12 will transfer the main part of the earth's magnetic lines from the core 10 to the core 11 or vice versa, the lines of force being concentrated to the cores 10 and 11 due to their high permeability. By the rotation of the armature 12 these lines of force are repeatedly caused to cut the windings of the loop 14 whereby an electrical voltage is induced in this loop. Under conditions of constant rotation speed of the armature 12 the induced E. M. F. is proportional to the field intensity in the longitudinal direction of the cores 10—11, and this in its turn is dependent upon the relation of this longitudinal direction to the direction of the magnetic field.

In Fig. 3, B is a vector representing the earth magnetic field, whereas N indicates the longitudinal direction of the cores 10—11 in a certain instance. The x-axis indicates the latitude, the y-axis the longitude and the z-axis zenith, being shown in 3 dimension perspective. The angle between the longitudinal direction of the cores N and the x-y-plane is indicated by $\alpha$, and the corresponding angle with the x-z-plane is indicated by $\beta$. The deviation is zero, so that the field B lies in the y-z-plane. The inclination angle is indicated by $\gamma$.

Since a vector can be regarded as constituted by the vectorial sum of its three projections on the respective axes the following equations are obtained wherein $\overline{B}$ and $\overline{N}$ represent vectorial values and B and N the numerical values of the earth's field and the cores respectively.

$$\overline{B}=B\cdot[\phi_{(x)}+\cos\gamma_{(y)}+\sin\gamma_{(z)}] \quad (1)$$
$$\overline{N}=N\cdot[\cos\alpha\cdot\cos\beta_{(x)}+\cos\alpha\cdot\sin\beta_{(y)}+\sin\alpha_{(z)}] \quad (2)$$

The vector product of $\overline{B}$ and $\overline{N}$ gives the field flux $\phi$ through the cores 10 and 11:

$$\phi=B\cdot N\cdot[\cos\gamma\cdot\cos\alpha\cdot\sin\beta_{(y)}+\sin\gamma\cdot\sin\alpha_{(z)}] \quad (3)$$

Assuming, that the arrangement according to Figs. 1 and 2 is carried on a vessel which maintains a constant course, the angle $\beta$ is fixed for this vessel, whereas the angle $\alpha$ varies with the rolling movements. It is possible to prove, that the vertical component of the rolling movement has substantially greater effect than the horizontal component of the rolling movement as shown by the following formula $$\Delta\phi_v=tg\gamma\cdot\Delta\phi_k \quad (4)$$

in which formula $\Delta\phi_v$ indicates the change of the vertical component of the field through the poles for a predetermined change in rolling movement, whereas $\Delta\phi_k$ indicates the corresponding change in the horizontal component. The inclination angle γ over the greater part of the earth being substantially greater than 45°, it is obvious that the compass will be very sensitive for the vertical component of the rolling movement. It therefore is advisable to stabilize the compass against such vertical movements by means of some gyro-arrangement.

Figure 5:
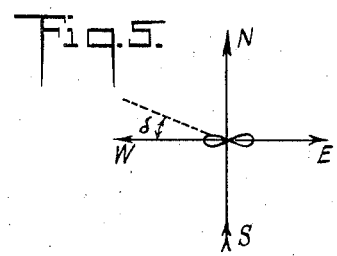

The angle β in Fig. 3 indicates the position of the projection of the cores on the horizontal plane. As the alternating voltage induced in the winding 14 is proportional to the field flux through the cores, the voltage derived from the Formula 3 is shown in the polar diagram of Fig. 4. In practice this does not exactly follow because the cores are not of infinitely small sectional area. Even if the cores were placed exactly in the direction E-W, there would exist an alternating field in the cores due to the rotation of the armature in the same manner as if the armature had been stationary in the geometrical longitudinal direction of the cores, but the cores had been put in vibration with a certain amplitude δ on each side of the E-W-direction. The characteristic of the additional voltage due thereto is shown in Fig. 5. The total voltage therefor has the characteristic which is shown in Fig. 6.

Figure 6:
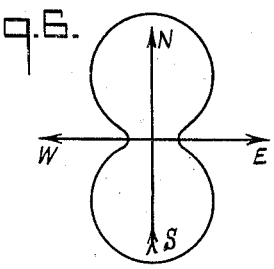

It is immediately evident from Fig. 6, that the characteristic has a very flat shape adjacent each of the four main geographical directions. The precision therefor is poor whether the reading is taken by means of a minimum voltage or by means of a maximum voltage. This disadvantage is obviated somewhat by imparting to the cores a polarization of substantially the same field intensity as the maximum field intensity in the N-S-direction. This can for instance be effected by uniting the cores with one or more permanent magnets, arranged in a suitable way, or by surrounding the cores by an electrical winding. The latter is preferable in cases where the induction compass is intended for a vessel which frequents far separated places and countries, where the field intensity of the earth magnetism varies greatly, as the intensity of the electrical current and hence the polarizing magnetic field intensity can thus be readily controlled.

Figure 7:
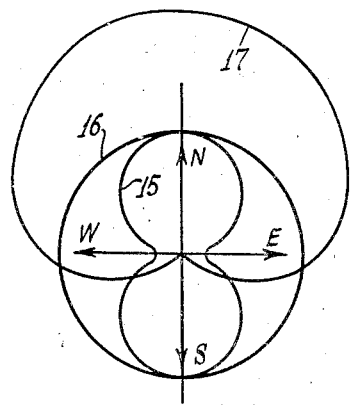

In Fig. 7, 15 indicates the same characteristic as was shown in Fig. 6, whereas the characteristic of the polarizing field intensity is indicated by 16. The resultant characteristic is indicated by 17. With an arrangement of this kind the reading of the N-S-direction can be obtained with a precision which is sufficient in certain cases, provided the polarizing field is of correct intensity. In such a case the voltage in one of the directions N or S, in the case chosen in Fig. 7 the direction S, becomes substantially zero.

In many cases even the precision obtained by the above arrangements is not sufficient. A much greater precision may, however, be obtained by the embodiment of the invention shown in Fig. 8. This contains two pairs of bars of high permeability, indicated at 18 and 19 and at 20 and 21, respectively. These pairs of bars are provided with armatures 22 and 23, respectively. Both of the armatures are arranged on a common shaft 24, which is driven by a motor 25. A cross bar 26 is positioned between the outer terminals of the bars 18 and 20, and a similar bar 27 is arranged between the outer terminals of the bars 19 and 21. The bars 26 and 27 are provided with electrical windings, schematically indicated by 28 and 29, respectively, for producing an electromagnetic field. As is evident from Fig. 8, this magnetic field polarizes the bars 18—19 and 20—21, respectively, in opposite directions, so that the voltages induced in the loops 30 and 31 have two characteristics which are mirror images of each other about the E-W-line. The polarization is adjusted to a suitable value by means of a rheostat resistor 32, connected in the circuit of the exciting windings 28, 29.

Another advantage of this arrangement is that possible minor errors in the value of the polarization will be of no noticeable effect on the reading of the geographical direction since the voltage in both of the windings 30 and 31 is the same in the E-W-direction. Of course this voltage is changed by an incorrect polarizing field intensity, but the change will be the same in each of the voltages, and the error will therefore not affect the reading of the E-W-direction.

Reading the E-W-direction is effected automatically. For this purpose the arrangement may be enclosed in a nonmagnetic case 33, rotatable about the motor shaft 24 and provided with a rack 34 which co-operates with a gear wheel 35 on the shaft 36. This is driven by a differential motor 37, which is schematically shown as a series motor with two opposed field windings 38 and 39.

One terminal of each of the two windings 30 and 31 in the induction compass is connected respectively to the cathode of the diode rectifier valves 40 and 41, provided in the usual manner with parallel resistors 42 and 43, respectively, and series resistors 44 and 45, respectively. All of these resistors are connected in parallel with by-path condensers for the alternating current. The common point of the resistors 44 and 45 is connected to the other terminal of each of the windings 30 and 31.

By this arrangement a direct current voltage is obtained across the resistor 44 which is proportional to the alternating current induced in the winding 30, and in a corresponding manner a voltage is obtained across the resistor 45 which is proportional to the alternating voltage in the winding 31. These two direct current voltages are fed to the control grids in two direct current amplifier valves 46 and 47, respectively, the anode circuits of which are connected to the field windings 38 and 39.

This arrangement functions in the following manner: As mentioned above, for each of the windings 30 and 31 there is obtained a characteristic curve of the same form as the characteristic curve 17 in Fig. 7. However, these characteristic curves are turned in opposite directions, as shown in Fig. 9 in which they are indicated at 48 and 49. Assuming now that the device is put into action at a moment when the longitudinal direction of the bars 18—21 is the one indicated by the line 50 of Fig. 9. The winding 30 will have a substantially higher voltage than the winding 31, as indicated by the points of intersection of the curves 48 and 49, respectively, with the arrow 50 and this in its turn produces a stronger positive voltage across the resistor 44 than across the resistor 45. Since these voltages are fed to the valves 46 and 47 as grid biases, a stronger current is obtained through the winding 38 of the differential motor 37. The motor 37 thereby begins to rotate in such a direction that the bars 18—21 are turned closer and closer to the E-W-direction. When finally this direction is reached the voltages in the windings 30 and 31 are equally great. Consequently the currents through the windings 38 and 39 become equally great and the motor 37 stops.

Every later change of the course of the vessel in which the induction compass is mounted again turns the bars out from the E-W-direction, but this is immediately compensated by the ensuing unbalance between the voltages induced in the windings 30 and 31 and the movements of the motor 37 caused thereby.

Although the invention has above been described in connection with one specific embodiment thereof, it is obvious that the invention is not restricted thereto but that various modifications may be made without departing from the scope of the invention.

What is claimed is:

1. An induction compass, comprising a pair of units, each unit comprising a pair of stationary members of magnetic material having pole pieces spaced to form a gap, the members of the two units being arranged in parallel spaced relationship, elongated magnetic members rotating in each gap respectively about an axis perpendicular to the longitudinal axis of said stationary members, conducting loops lying in a plane containing the stationary members and each enclosing a respective one of said rotating members so that said rotating members rotate therein and cause the lines of force from said pole pieces to cut said respective coils, means inducing in said stationary members of the respective units polarizing magnetic fields of opposite directions superimposed on the fields induced therein by the earth's magnetic field, so that when said stationary members are in east-west magnetic direction equal voltages are induced in the loops of the respective units.

2. An induction compass as set forth in claim 1, in which said inducing means comprise transverse magnetic members connecting adjacent ends of the parallel magnetic members to form a closed magnetic circuit through both of said units.

3. In an induction compass as set forth in claim 1, transverse magnetic members connecting adjacent ends of the parallel magnetic members to form a closed magnetic circuit through both of said units, and windings on said transverse members connected and arranged to produce said polarization.

4. In an induction compass as set forth in claim 1, a common shaft carrying the rotating members of both of said units and means driving said shaft.

5. In an induction compass as set forth in claim 1, a follow-up motor responsive to the differential effect of said loops, means connecting said loops to said motor in opposite sense for actuating the same in accordance with the differential effect thereof.

HARALD VALDEMAR ALEXANDERSSON.
ADOLF STELLAN DAHLSTEDT.